United States Patent [19]

Groenhof

[11] Patent Number: 5,130,041
[45] Date of Patent: Jul. 14, 1992

[54] SILICONE FLUID COMPOSITIONS HAVING REDUCED VISCOSITY TEMPERATURE COEFFICIENT

[75] Inventor: Eugene D. Groenhof, Saginaw County, Mich.

[73] Assignee: Dow Corning Corporation, Midland, Mich.

[21] Appl. No.: 541,648

[22] Filed: Jun. 21, 1990

[51] Int. Cl.$^5$ .................. C09K 5/00; C10M 105/76
[52] U.S. Cl. .................. 252/78.3; 252/496; 252/573; 524/264
[58] Field of Search .......... 252/78.3, 573, 49.6; 106/287.14, 287.1, 287.13; 525/477; 524/268

[56] References Cited

U.S. PATENT DOCUMENTS

| | | | |
|---|---|---|---|
| 2,491,843 | 12/1949 | Wilcock | 260/448.24 |
| 2,614,989 | 10/1952 | Hunter et al. | 252/49.6 |
| 3,231,532 | 1/1966 | Modic | 524/268 |
| 4,171,267 | 10/1979 | McAfee et al. | 252/49.6 |
| 4,207,246 | 6/1980 | Hafner | 252/78.3 |
| 4,585,705 | 4/1986 | Broderick | 524/268 |
| 4,696,756 | 9/1987 | Yoshitake | 252/78.3 |
| 4,840,743 | 6/1989 | Gardiner | 252/49.6 |
| 4,943,601 | 7/1990 | Dinallo | 524/268 |

OTHER PUBLICATIONS

Ivanova, N., et al., "Study of the Viscous Flow of Dimethylsiloxane Polymer & Rubber Solutions Over A Wide Range of Deformation Rates", Journal of the Theoretical & Experimental Chemistry and Physics of Macromolecular Compounds, 18 Mar. 1968, pp. 1145-1149.

Primary Examiner—Paul Lieberman
Assistant Examiner—Erin M. Higgins
Attorney, Agent, or Firm—Alexander Weitz

[57] ABSTRACT

Silicone hydraulic compositions, comprising a polydimethylsiloxane fluid and a phenylmethylsiloxane/dimethylsiloxane copolymer having a viscosity at least ten fold greater than said polydimethylsiloxane fluid and having a molar phenylmethylsiloxane content of about 4.5 percent to about 7 percent are disclosed. The fluids exhibit a reduced viscosity temperature coefficient (VTC) relative to conventional polydimethylsiloxane oils and are useful in hydraulic applications such as viscous coupling and viscous damping.

15 Claims, No Drawings

SILICONE FLUID COMPOSITIONS HAVING REDUCED VISCOSITY TEMPERATURE COEFFICIENT

This invention relates to hydraulic fluids. More specifically, the present invention relates to silicone hydraulic fluids having an exceptionally low viscosity temperature coefficient.

BACKGROUND OF THE INVENTION

Many applications of hydraulic fluids require that the viscosity of the fluid change as little as possible over the intended operating temperature range. Silicone fluids, and polydimethylsiloxane fluids in particular, are known to have a low viscosity variation as a function of temperature relative to organic oils. This property, along with its thermal and oxidative stability, often makes polydimethylsiloxane oil the hydraulic fluid of choice in many high performance applications.

In some critical applications, however, the ideal hydraulic fluid would show essentially no change in viscosity over the temperature range of interest. Thus, material scientists continue to search for a practical system which would approach this ideal. One traditional method used to reduce the variation of viscosity with temperature of petroleum oils (e.g., automotive motor oil) entails the dissolution of a high molecular weight polymer (e.g., polymethylmethacrylate) in the oil. Unfortunately, this approach has not been found to be very effective in the case of polydimethylsiloxane oils. Thus, the viscosity temperature coefficient (VTC), defined herein by the expression $$VTC = 1 - (\text{viscosity @100° C.}/\text{viscosity @38° C.})$$

remains essentially unchanged at about 0.6 when a typical polydimethylsiloxane oil, having a viscosity of about 100 to 10,000 cP, is modified with several weight percent of a high molecular weight polydimethylsiloxane gum. Naturally, in the aforementioned applications, as low a VTC value as possible is preferred.

SUMMARY OF THE INVENTION

It has now been discovered that a silicone hydraulic fluid having a significantly reduced VTC can be obtained by mixing certain polydimethylsiloxane/polyphenylmethylsiloxane copolymers with a polydimethylsiloxane oil. Surprisingly, only a very narrow range of this composition results in the low VTC values. While applicant does not wish to be bound by any particular theory or mechanism, it is believed that the compositions of the present invention undergo a transition from a stable two-phase suspension at lower temperatures to a more soluble mixture, or solution, at elevated temperatures in the temperature range of about 25° C. to about 150° C. This type of behavior in polymer-polymer mixtures is rare in nature and the implied phase change is further believed to be responsible for the observation that the value of the viscosity of such a mixture can depend not only on temperature, but also on the direction from which the temperature was reached (i.e., viscosity may be different on cooling from that on heating the composition).

The present invention therefore relates to a composition comprising:

(A) 100 parts by weight of a polydimethylsiloxane fluid; and (B) from about 2 to about 20 parts by weight of a phenylmethylsiloxane/dimethylsiloxane copolymer having a viscosity at least ten fold greater than said polydimethylsiloxane fluid and having a molar phenylmethylsiloxane content of about 4.5 to about 7 percent.

DETAILED DESCRIPTION OF THE INVENTION

The polydimethylsiloxane fluid of component (A) of the present invention is well known in the art and is available commercially. This fluid is preferably a linear polymer having a viscosity of about 100 to about 100,000 cP at 25° C. and consisting essentially of dimethylsiloxane units. Component (A) may also be a branched copolymer fluid which contains up to about 25 mole percent of methylsilsesquioxane units (i.e., $MeSiO_{3/2}$ units, wherein Me hereinafter denotes a methyl radical). The nature of the terminal groups of polydimethylsiloxane fluid (A) is not critical for the purposes of the present invention and these may be selected from triorganosiloxy groups, hydroxy diorganosiloxy groups or halogen-containing organosiloxy groups. Specific examples of such terminal groups include trimethylsiloxy, triethylsiloxy, hydroxydimethylsiloxy, phenyldimethylsiloxy and chloropropyldimethylsiloxy, inter alia. It is preferred that the terminal groups are selected from trialkylsiloxy groups wherein the alkyl groups contain 1 to 3 carbon atoms. A highly preferred component (A) of this invention is trimethylsiloxy endcapped, linear, polydimethylsiloxane having a viscosity of about 1,000 to about 100,000 cP at 25° C., most preferably 5,000 to 15,000 cP at 25° C.

Component (B) of the present invention is a phenylmethylsiloxane/dimethylsiloxane copolymer having a molar content of phenylmethylsiloxane units of about 4.5 to about 7 percent, preferably from 4.5 to 6 mole percent. Copolymer (B) must have a viscosity (at 25° C.) at least about ten fold greater than component (A) to be within the scope of the present invention, typical values being about $10^4$ to about $10^{11}$ cP at 25° C. As described above for component (A), the nature of the terminal groups of copolymer (B) is not critical, trimethylsiloxy groups being preferred. This copolymer may be a block or a random copolymer. It may be prepared by methods well known in the art, such as by the co-hydrolysis and subsequent condensation of the respective chlorosilanes or by the base-catalyzed equilibration of the respective linear or cyclic siloxane species, along with the appropriate endblocking siloxane. Preferably, component (B) is a random copolymer fluid or gum having an average degree of polymerization of about 500 to about 10,000.

The compositions of this invention may be prepared by thoroughly mixing from about 2 to about 20 parts by weight of copolymer (B) with 100 parts by weight of polydimethylsiloxane (A). A uniform dispersion may be attained by using a high shear mixer but it is preferred that the two components are blended together in a mutual solvent, the latter being stripped out afterwards, to provide the compositions of the present invention. Preferably, from about 5 to about 15 parts by weight of (B) are so mixed with 100 parts by weight of (A). It has further been found that, within the above defined parameters, the viscosity of component (A) should be low when component (B) has a relatively high phenylmethylsiloxane content. Conversely, when the phenylmethylsiloxane content of (B) is relatively low, the viscosity of (A) should be adjusted upward, such refinements being subject to routine experimentation by those skilled in the art.

The compositions of the present invention may further contain additives commonly employed in the art to modify silicone hydraulic fluids, such as dyes, thermal stabilizers, antioxidants, antiwear additives, friction modifiers, corrosion inhibitors and antifoams, among others.

The compositions of this invention find utility in a method for reducing the temperature dependence of the viscosity of a polydimethylsiloxane fluid, said method comprising mixing components (A) and (B), as described above. By this method, the above defined viscosity temperature coefficient (VTC) of the polydimethylsiloxane fluid can be reduced by as much as 50 percent. This dramatic and unexpected reduction in the VTC of the polydimethylsiloxane fluid greatly enhances its performance in such hydraulic systems as viscous coupling devices, shock absorbers, viscous damping devices and certain lubricated devices which require a relatively constant traction.

EXAMPLES

The following examples are presented to further illustrate the compositions of this invention, but are not to be construed as limiting the invention, which is delineated in the appended claims. All parts and percentages in the examples are on a weight basis unless indicated to the contrary.

EXAMPLES 1-9

A phenylmethylsiloxane/dimethylsiloxane random copolymer gum having a phenylmethylsiloxane content of about 4.5 mole percent was prepared by equilibrating 706.7 grams of $(Me_2SiO)_c$, in which c is 3 to about 7; 0.31 gram of a polydimethylsiloxane having the formula $Me_3SiO(Me_2SiO)_2SiMe_3$; and 61.2 grams of $(PhMeSiO)_x$, in which x is 3 to about 6, with 1.92 grams of a tetrabutyl phosphonium silanolate (TBPS) catalyst having an equivalent weight of 2,000. In the above formulas, and hereinafter, Me and Ph denote a methyl and a phenyl radical, respectively. The ingredients were charged to a two liter resin kettle fitted with a thermometer, stirrer, reflux condenser/Dean Stark trap and heating mantle. A vacuum ($\approx$70 mm Hg) was applied at the top of the reflux condenser and the mixture was stirred and heated to 100° C., at which point boiling began. The viscosity of the mixture increased rapidly and the contents could no longer be stirred after about 30 minutes. The temperature was maintained at about 100° C. for four hours, whereupon the vacuum was released and a nitrogen gas purge was introduced at the top of the reflux condenser. The product was then slowly heated to 180°-190° C. and held at this temperature for one hour to decompose the TBPS catalyst. The resulting gum had an approximate degree of polymerization (DP) of 10,000 and a viscosity of about $2.4 \times 10^7$ cP at 25° C.

Five grams of the above phenylmethylsiloxane/dimethylsiloxane copolymer were mixed with 45 grams of a trimethylsiloxy endblocked polydimethylsiloxane having a viscosity of about 13,000 cP at 25° C. and 50 grams of n-hexane to obtain a uniform solution. The solution was then stripped under vacuum to a temperature of 90° C., at a pressure of less than 1 mm Hg, using a rotary evaporator. The product was a cloudy fluid suspension at room temperature; it became clear on heating to about 130° C. and returned to its cloudy state when allowed to cool again.

Viscosity of the above mixture was determined as a function of temperature using a BROOKFIELD viscometer (Model LVF, Spindle No. 4 at 12 r.p.m.). The composition was first heated to 160° C. and then allowed to cool at about 20° C. per hour and the viscosity was recorded at small temperature intervals. The following day, the sample was heated at about 35° C. per hour and the viscosity was again recorded as a function of temperature. Table 1 shows representative values of the viscosity at key temperatures during these cooling and heating cycles.

TABLE 1

| Temperature (°C.) | Viscosity (cP) | |
|---|---|---|
| | Cooling Cycle | Heating Cycle |
| 25 | — | 25,700 |
| 38 | 24,000 | 22,000 |
| 50 | 21,100 | 19,050 |
| 75 | 19,500 | 15,050 |
| 100 | 16,900 | 12,450 |
| 150 | 9,800 | 9,850 |

The viscosity of this mixture thus exhibits a form of hysteresis behavior when it is plotted against temperature (i.e., the viscosity in this region depends on whether the composition is being heated or being cooled).

Other phenylmethylsiloxane/dimethylsiloxane copolymer gums, having phenylmethylsiloxane contents of 1 to 10 mole percent and a degree of polymerization of about 10,000, were prepared as described above. Each copolymer gum was mixed with a portion of the above described trimethylsiloxy endblocked polydimethylsiloxane fluid in the amount indicated in Table 2. The viscosity of each such mixture was determined as described above, wherein each composition was first heated to 160° C. and then allowed to cool at about 20° C.-30° C. per hour. The results of these "cooling cycle" measurements are presented in Table 2, wherein the observed degree of clarity of each mixture is also reported.

TABLE 2

| | Gum wt. % | Mole % of Phenylmethyl-siloxane Units in Gum | Viscosity (cP) | | | | VTC* | Appearance | | |
|---|---|---|---|---|---|---|---|---|---|---|
| | | | @ 25° C. | @ 38° C. | @ 100° C. | @ 150° C. | | @ 25° C. | @ 100° C. | @ 150° C. |
| (Comparative) Example 1 | 0 | — | 13,320 | 10,520 | 4,300 | — | 0.59 | clear | clear | clear |
| (Comparative) Example 2 | 10 | 0 | 75,000 | 61,500 | 26,300 | — | 0.59 | clear | clear | clear |
| (Comparative) Example 3 | 10 | 1 | 27,800 | 22,400 | 9,250 | — | 0.59 | clear | clear | — |
| (Comparative) Example 4 | 10 | 4 | 46,000 | 36,200 | 14,750 | — | 0.59 | clear | clear | — |
| Example 5 | 10 | 4.5 | 25,700 | 24,000 | 16,900 | 9,800 | 0.30 | cloudy | cloudy | clear |

TABLE 2-continued

| | Gum wt. % | Mole % of Phenylmethyl-siloxane Units in Gum | Viscosity (cP) | | | | VTC* | Appearance | | |
|---|---|---|---|---|---|---|---|---|---|---|
| | | | @ 25° C. | @ 38° C. | @ 100° C. | @ 150° C. | | @ 25° C. | @ 100° C. | @ 150° C. |
| Example 6 | 10 | 6 | 22,100 | 19,400 | 9,500 | — | 0.51 | cloudy | cloudy | cloudy |
| (Comparative) Example 7 | 10 | 7.5 | 17,000 | 13,560 | 5,500 | 3,200 | 0.59 | cloudy | cloudy | cloudy |
| (Comparative) Example 8 | 5 | 8 | 13,500 | 10,700 | 4,340 | 2,600 | 0.59 | cloudy | cloudy | cloudy |
| (Comparative) Example 9 | 10 | 10 | 14,300 | 11,300 | 4,750 | — | 0.58 | cloudy | less cloudy | — |

*VTC = Viscosity Temperature Coefficient

It can be seen from Table 2 that the use of a soluble polydimethylsiloxane homopolymer (i.e., zero phenylmethylsiloxane content; Comparative Example 2) greatly increases the viscosity over the control fluid (Comparative Example 1), but it does not result in a change in the VTC. Likewise, the use of an insoluble gum which had a phenylmethylsiloxane content outside of the scope of the present invention (i.e., Comparative Examples 3, 4 and 7-9) also thickened the base polydimethylsiloxane fluid but did not substantially affect its VTC. Only the compositions of the present invention (Examples 5 and 6) showed reductions in the VTC by as much as about 50 percent. Moreover, it was observed that the composition of (Comparative) Example 7 separated into two distict phases upon storage at room temperature for less than three years whereas the hydraulic fluid of Example 5 was still a uniform, albeit hazy, dispersion after similar storage for about two and one half years.

EXAMPLES 10-11

The procedures of Examples 1-9 were followed wherein two different amounts of the above described phenylmethylsiloxane/dimethylsiloxane copolymer gum having a phenylmethylsiloxane content of about 4.5 mole percent were mixed with a formulated polydimethylsiloxane fluid. The fluid was a trimethylsiloxy endblocked, linear polydimethylsiloxane having a viscosity of about 6,000 cP at 25° C. and contained 2 percent of a thermal stability additive having the average structure

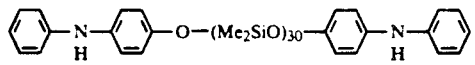

The viscosity-temperature behavior of these two compositions was determined during a cooling cycle, as above, the results being presented in Table 3.

TABLE 3

| | Weight % of Gum in Fluid | Viscosity (cP) | | | | |
|---|---|---|---|---|---|---|
| | | 25° C. | 38° C. | 100° C. | 150° C. | VTC |
| Example 10 | 12.5 | 24,750 | 20,400 | 14,700 | 11,100 | 0.28 |
| Example 11 | 10 | 18,500 | 16,000 | 10,850 | 8,050 | 0.32 |

Again, it is seen that the viscosity temperature coefficients of the compositions of the present invention are considerably lower than those of prior art polydimethylsiloxane compositions (i.e., VTC of about 0.6).

I claim:
1. A composition comprising:

(A) 100 parts by weight of a polydimethylsiloxane fluid; and
(B) from about 2 to about 20 parts by weight of a phenylmethylsiloxane/dimethylsiloxane copolymer having a viscosity at least ten fold greater than said polydimethylsiloxane fluid and having a molar phenylmethylsiloxane content of about 4.5 percent to about 7 percent.

2. The composition according to claim 1, wherein said polydimethylsiloxane fluid (A) is a linear polydimethylsiloxane having a viscosity of about 100 to about 100,000 cP at 25° C.

3. The composition according to claim 2, wherein said phenylmethylsiloxane/dimethylsiloxane (B) is a random copolymer.

4. The composition according to claim 3, wherein said phenylmethylsiloxane/dimethylsiloxane copolymer (B) has an average degree of polymerization of about 500 to about 10,000.

5. The composition according to claim 4, wherein from about 5 to about 15 parts by weight of said phenylmethylsiloxane/dimethylsiloxane copolymer (B) are used for each 100 parts by weight of said polydimethylsiloxane fluid (A).

6. The composition according to claim 1, wherein said phenylmethylsiloxane/dimethylsiloxane copolymer (B) has a molar phenylmethylsiloxane content of about 4.5 percent to about 6 percent.

7. The composition according to claim 6, wherein said polydimethylsiloxane fluid (A) is a linear polydimethylsiloxane having a viscosity of about 5,000 to about 15,000 cP at 25° C.

8. The composition according to claim 7, wherein said phenylmethylsiloxane/dimethylsiloxane (B) is a random copolymer.

9. The composition according to claim 8, wherein said phenylmethylsiloxane/dimethylsiloxane copolymer (B) has an average degree of polymerization of about 500 to about 10,000.

10. The composition according to claim 9, wherein from about 10 to about 15 parts by weight of said phenylmethylsiloxane/dimethylsiloxane copolymer (B) are used for each 100 parts by weight of said polydimethylsiloxane fluid (A).

11. A method for reducing the temperature dependence of the viscosity of a polydimethylsiloxane fluid, said method comprising mixing with said polydimethylsiloxane fluid a phenylmethylsiloxane/dimethylsiloxane copolymer having a viscosity at least ten fold greater than said polydimethylsiloxane fluid and having a molar phenylmethylsiloxane content of about 4.5 percent to about 7 percent.

12. The method according to claim 11, wherein said polydimethylsiloxane fluid is a linear polymer having a viscosity of about 100 to about 100,000 cP at 25° C.

13. The method according to claim 12, wherein said phenylmethylsiloxane/dimethylsiloxane is a random copolymer.

14. The method according to claim 13, wherein said phenylmethylsiloxane/dimethylsiloxane copolymer has an average degree of polymerization of about 500 to about 10,000.

15. The method according to claim 14, wherein from about 5 to about 15 parts by weight of said phenylmethylsiloxane/dimethylsiloxane copolymer are used for each 100 parts by weight of said polydimethylsiloxane fluid.

* * * * *